United States Patent
McCartney et al.

(10) Patent No.: US 8,084,914 B2
(45) Date of Patent: Dec. 27, 2011

(54) STATOR COIL RETENTION SYSTEM FOR UNVARNISHED STATORS

(75) Inventors: Patrick M. McCartney, Bartlesville, OK (US); David Fielder, Dewey, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 367 days.

(21) Appl. No.: 12/359,620

(22) Filed: Jan. 26, 2009

(65) Prior Publication Data

US 2010/0187942 A1    Jul. 29, 2010

(51) Int. Cl.
*H02K 3/46* (2006.01)
*H02K 3/50* (2006.01)

(52) U.S. Cl. .......... 310/260; 310/89; 310/194; 310/214; 310/270

(58) Field of Classification Search .......... 310/89, 310/214, 260, 270, 194; *H02K 3/46, 3/50*
See application file for complete search history.

(56) References Cited

U.S. PATENT DOCUMENTS

| | | | |
|---|---|---|---|
| 849,670 A * | 4/1907 | Porster | 310/260 |
| 940,632 A * | 11/1909 | Behrend | 310/260 |
| 1,512,693 A * | 10/1924 | Juillard | 310/260 |
| 2,568,548 A | 9/1951 | Howard | |
| 2,996,658 A | 8/1961 | Kirchner | |
| 3,435,517 A * | 4/1969 | Fortenbach et al. | 29/596 |
| 3,908,143 A * | 9/1975 | Buncher | 310/260 |
| 3,991,334 A * | 11/1976 | Cooper et al. | 310/260 |
| 4,016,443 A * | 4/1977 | Johnson | 310/260 |
| 4,833,354 A * | 5/1989 | Miller | 310/87 |
| 4,943,749 A * | 7/1990 | Ponce et al. | 310/260 |
| 5,319,269 A | 6/1994 | Bryant | |
| 6,583,532 B2 * | 6/2003 | Hein et al. | 310/260 |
| 2002/0109425 A1 * | 8/2002 | Modi et al. | 310/89 |
| 2003/0020347 A1 * | 1/2003 | Rupp et al. | 310/91 |
| 2004/0182596 A1 * | 9/2004 | Sedlak | 174/120 R |
| 2007/0278879 A1 | 12/2007 | Kaminski | |
| 2009/0058221 A1 | 3/2009 | Liu | |
| 2010/0187942 A1 * | 7/2010 | McCartney et al. | 310/214 |

FOREIGN PATENT DOCUMENTS

GB    2220527    1/1990

* cited by examiner

*Primary Examiner* — Quyen Leung
*Assistant Examiner* — John K Kim
(74) *Attorney, Agent, or Firm* — Jim Patterson

(57) ABSTRACT

A downhole electric motor device has a longitudinally extending tubular housing; a stator part deployed within the tubular housing; a stator coil winding looped through the stator part with an end turn having an apex; and a connecting device connecting between at least one of the coil windings and an end of the housing adjacent to an end of the stator part, thereby supporting the coil winding.

20 Claims, 4 Drawing Sheets

STATOR COIL RETENTION SYSTEM FOR UNVARNISHED STATORS

TECHNICAL FIELD

The present application relates generally to enhancements in downhole electrical motors, and in particular to supporting and restraining the movement of stator coils located within the motor housing.

BACKGROUND

Electrical motors are often placed downhole in an oil or gas field to perform a variety of functions. These functions can include artificial lift, whereby the motor drives a pump that is used to bring downhole fluids to the surface. A typical motor can be 6 inches in diameter and 30 feet long. The wire used in the windings can be ⅛ inch magnet wire. The magnet wire can be over 1000 feet long. The magnet wire is wound through the lamination stack many times to create a stator coil for each phase of the motor. The stator coils in a three phase AC motor can weigh in excess of 600 pounds.

Some designs for downhole motors use stator coils that are wrapped in polyimide tape and treated with varnish. The varnishing process provides mechanical stiffness, insulation, protects the stator coils from vibration damage, protects the coils from water, and holds the stator coils in place. The varnish itself has an upper limit operating temperature approaching 400° F. The varnish can be used in conjunction with epoxy, increasing the effective operating temperature to 550° F. At or above those temperatures the varnish will generally melt, causing the motor to be inoperable.

It is beneficial if artificial lift equipment can operate in higher temperature environments. In a steam assisted gravity drainage system a small borehole injects steam into the formation and another larger borehole below the small borehole collects the resulting production fluids. The steam is used to lower the viscosity of the well fluids and promote production of formation fluids that normally would not be possible. However, the temperature requirements for such operation can be in excess of 550° F. Therefore, a varnished stator coil can become a limiting factor when artificial lift equipment is deployed downhole in such an environment. Absent the varnish, issues can develop relating to inadequate support of the weight of the stator windings.

Accordingly, there exists a need for an apparatus and a method to retain unvarnished stator coils inside a motor housing.

SUMMARY

Embodiments in the present application relate to a downhole electric motor device comprising: a longitudinally extending tubular housing; a stator part deployed within the tubular housing; a stator coil winding looped through the stator part with an end turn having an apex; and a connecting device connecting between at least one of the coil windings and an end of the housing adjacent to an end of the stator part, thereby supporting the coil winding Other or alternative embodiments having fewer or additional features will be apparent from the following description, from the drawings, and from the claims.

BRIEF DESCRIPTION OF THE DRAWINGS

Certain embodiments will hereafter be described with reference to the accompanying drawings, wherein like reference numerals denote like elements, and.

It is to be noted, however, that the appended drawings illustrate only typical embodiments and are therefore not to be considered limiting of claim scope, for the embodiments may admit to other equally effective embodiments.

DETAILED DESCRIPTION

In the following description, numerous details are set forth to provide an understanding of the various embodiments. However, it will be understood by those skilled in the art that those embodiments presented may be practiced without these details and that numerous variations or modifications from the described embodiments may be possible.

In the specification and appended claims, the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly described some embodiments. However, when applied to equipment and methods for use in wells that are deviated or horizontal, such terms may refer to a left to right, right to left, or other relationship as appropriate. Moreover, the term "sealing mechanism" includes: packers, bridge plugs, downhole valves, sliding sleeves, baffle-plug combinations, polished bore receptacle (PBR) seals, and all other methods and devices for temporarily blocking the flow of fluids through the wellbore. Furthermore, the term "treatment fluid" includes fluid delivered to a formation to stimulate production including, but not limited to, fracing fluid, acid, gel, foam or other stimulating fluid.

The present application generally relates to a well system that utilizes a submersible motor. By way of example, a submersible motor may be used in an electric submersible pumping system to produce or otherwise move desired fluids. An embodiment can include a submersible motor constructed with unvarnished stator coils with a support device to be utilized in order to support the stator coil windings within the motor housing.

Figure 1:
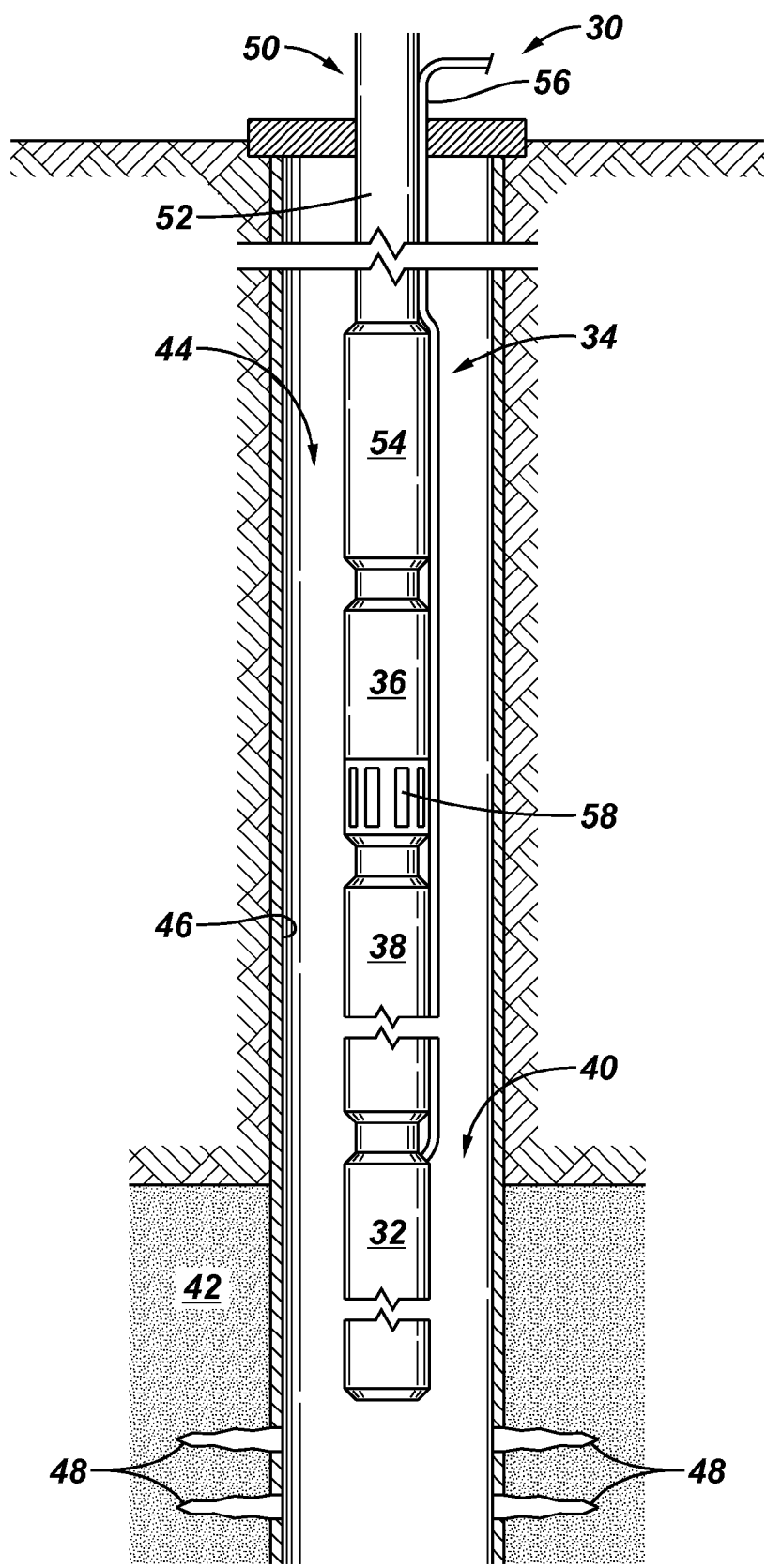
FIG. 1 is a front elevation view of a well system having a submersible motor in a wellbore, according to an embodiment.

In the embodiment illustrated in FIG. 1, an electric submersible pumping system 34 is designed for deployment in a well 40 within a geological formation 42 containing desirable production fluids, such as hydrocarbon based fluids. A wellbore 44 typically is drilled into formation 42 and, at least in some applications, is lined with a wellbore casing 46. The wellbore casing 46 is perforated to form a plurality of openings (perforations) 48 through which production fluids can flow from formation 42 into wellbore 44. In other applications, the submersible pumping system 34 can be used to deliver treatment fluids downhole and out through perforations 48 into the surrounding reservoir.

The electric submersible pumping system 34 may be deployed into wellbore 44 with a suitable conveyance system 50 that can be constructed in a variety of forms and configurations depending on the application. For example, conveyance system 50 may comprise a tubing 52, such as production tubing or coiled tubing. The conveyance system 50 is connected to submersible pump 36 or to another appropriate component of electric submersible pumping system 34 by a connector 54. In the embodiment illustrated, a power cable 56 is routed downhole along conveyance system 50 and electric submersible pumping system 34 to submersible motor 32. The power cable 56 provides electrical power to submersible motor 32 so the submersible motor can, in turn, power submersible pump 36. In operation, the submersible pump 36 draws well fluid into the electric submersible pumping system 34 via a pump intake 58 and pumps the fluid to a collection location through, for example, tubing 52.

By way of example, submersible motor 32 may comprise a three-phase, induction motor in which stator coils 76 provide the motor field. The submersible motor may be constructed without varnish, and the stator coils 76 have end turns 77a and 77b that are supported with a support device, as described in greater detail below.

Figure 2:
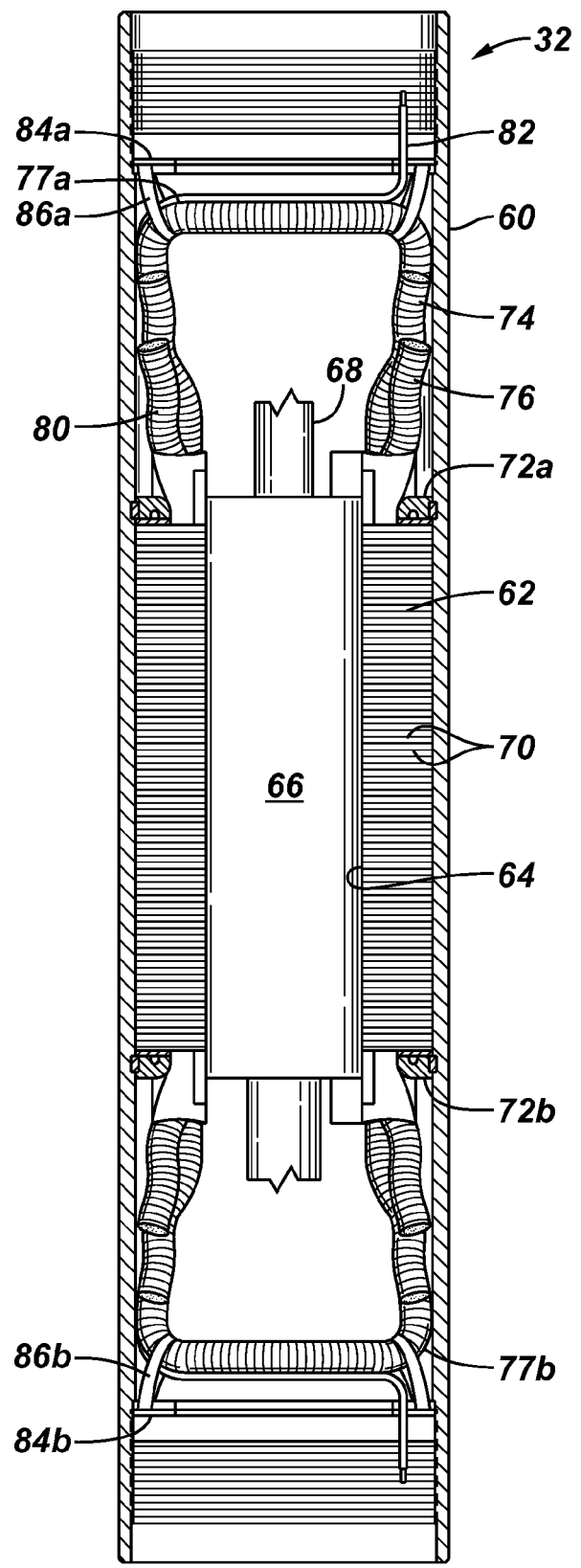
FIG. 2 is a partial cross-section of the submersible motor illustrated in the well system of FIG. 1, according to an embodiment.

Referring generally to FIG. 2, one embodiment of submersible motor 32 is illustrated. In this embodiment, submersible motor 32 comprises an outer housing 60, such as a tubular housing. A stator 62, having a stator bore 64, is positioned within the housing 60 such that the stator bore 64 is generally aligned with housing 60 in an axial direction. A rotor 66 is rotatably positioned within stator bore 64 and coupled to a drive shaft 68. During operation, the rotating rotor 66 causes drive shaft 68 to rotate, and this rotation is used to drive submersible pump 36.

By way of example, stator 62 is formed with a plurality of laminations 70, such as steel laminations with insulation between each lamination. The stack of steel laminations may be insulated by suitable end laminations 72a and 72b disposed at opposed axial ends of the lamination stack 70. In many applications, the laminations are perforated in a manner that creates generally axial slots to receive insulated magnet wire conductors 74 that form the motor stator coil 76. At axial ends of the lamination stack, the insulated wire conductors 74 of the stator coils 76 are looped into end turns 77a and 77b. The end turns 77a and 77b enable the insulated wire conductors 74 to be directed back through the lamination stack via axial slots according to a desired winding pattern. The insulated wire conductors 74 that form end turns 77a and 77b can be grouped together with each group secured by a suitable wrap 80 or other type of covering. Electrical power is supplied to winding 76 via appropriate lead wires 82. Submersible motor 32 is a three-phase motor comprising stator coils 77 for all three phases, as well as associated end turns 77a and 77b for each stator coil 74.

Figure 3A:
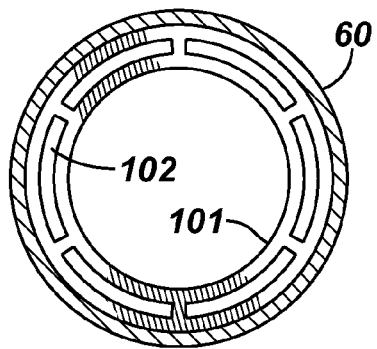
FIG. 3 is a top view of the support device as illustrated in FIG. 2, according to several embodiments.

By way of example, an embodiment of the invention might include using a support device 84a and 84b. The support device 84a and 84b can be flat in shape and have slots 102 as depicted in FIG. 3A that provide connecting points. After each of the three stator coils 76 required for an AC motor 32 have been threaded, taped 80, and coated with an epoxy, the support devices 84a and 84b are threaded into place at both ends of the housing 60. Then, each of the end turns 77a and 77b are connected with the adjacent support devices 84a and 84b with a connecting device 86a and 86b in order to connect between the stator coils 76 and the support device 84a and 84b. For example, the connecting device can be fiberglass tape. Furthermore, the connecting device 86a and 86b can help prevent axial and radial movement of the stator coils 76.

Figure 3B:
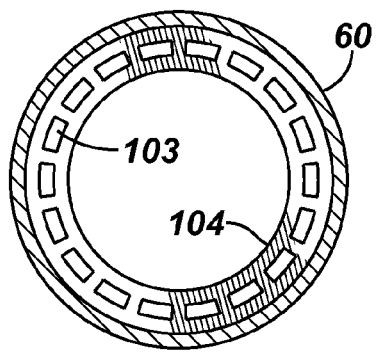
Figure 3C:
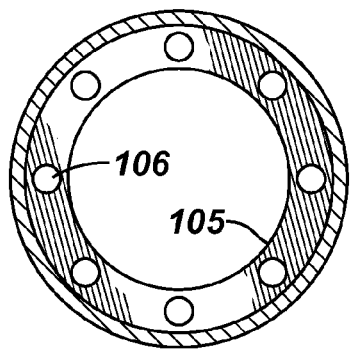

By way of example, the support devices 84a and 84b could be configured with various types of slot configurations as illustrated in FIG. 3. FIG. 3A depicts a support device 101 located within a housing. The slots 102 can be a pattern optimized to support the weight of the stator coil 76 as well as other design considerations. The slots 103 for support device 104 are smaller and would be able to support more stator coil 76 weight. The support device 105 is easier to manufacture because the slots 106 can be formed from a simple drilling process.

Figure 4A:
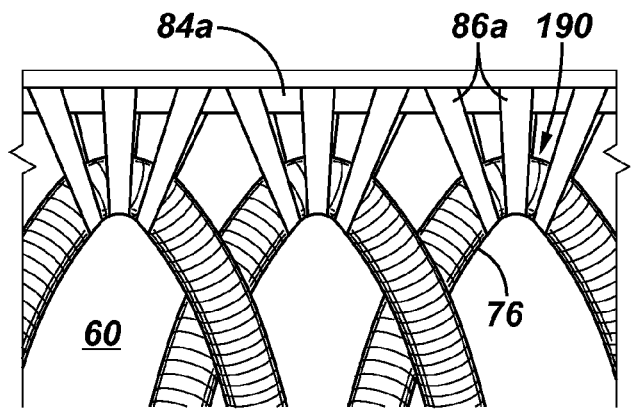
FIG. 4 is an inner panoramic view of the support device as illustrated in FIG. 2, according to several embodiments.
Figure 4B:
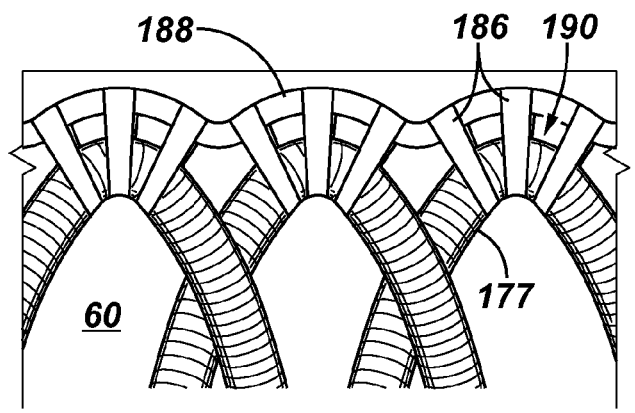

Another embodiment of the invention utilizes a support device 188 with a wave shaped profile to minimize stator coil 76 movement. For comparison reasons FIG. 4A depicts an inner panoramic of the previous embodiments while FIG. 4B depicts the inner panoramic of the current embodiment. After each of the three stator coils 177 of an AC motor are threaded, taped, and coated with an epoxy, the wave shaped support device 188 is screwed into place. Then, each of the three end turns are connected (e.g., tied) to the wave shaped support device 188 with the connecting device 186, e.g., a sufficient amount of fiberglass tape 186, in order to suspend the stator coils 177 from the support device 188. Next, a wave shaped support device 188 on the opposite side of the housing 60 is screwed into place and again the end turns 190 on the opposite side are connected with the connecting device 186 and can prevent axial and radial movement of the stator coils 177. The profile of the wave shaped support device 188 is such that the restraining mechanism, in this case fiberglass tape 86, has tension forces that are normal to the point of the end turn 190 where the fiberglass tape 86 is in contact. That will prevent the fiberglass tape 186 from sliding in the direction of the apex of the end turn 190. As a result, the forces on the fiberglass tape 86 will be evenly distributed and less prone to failure.

Figure 5:
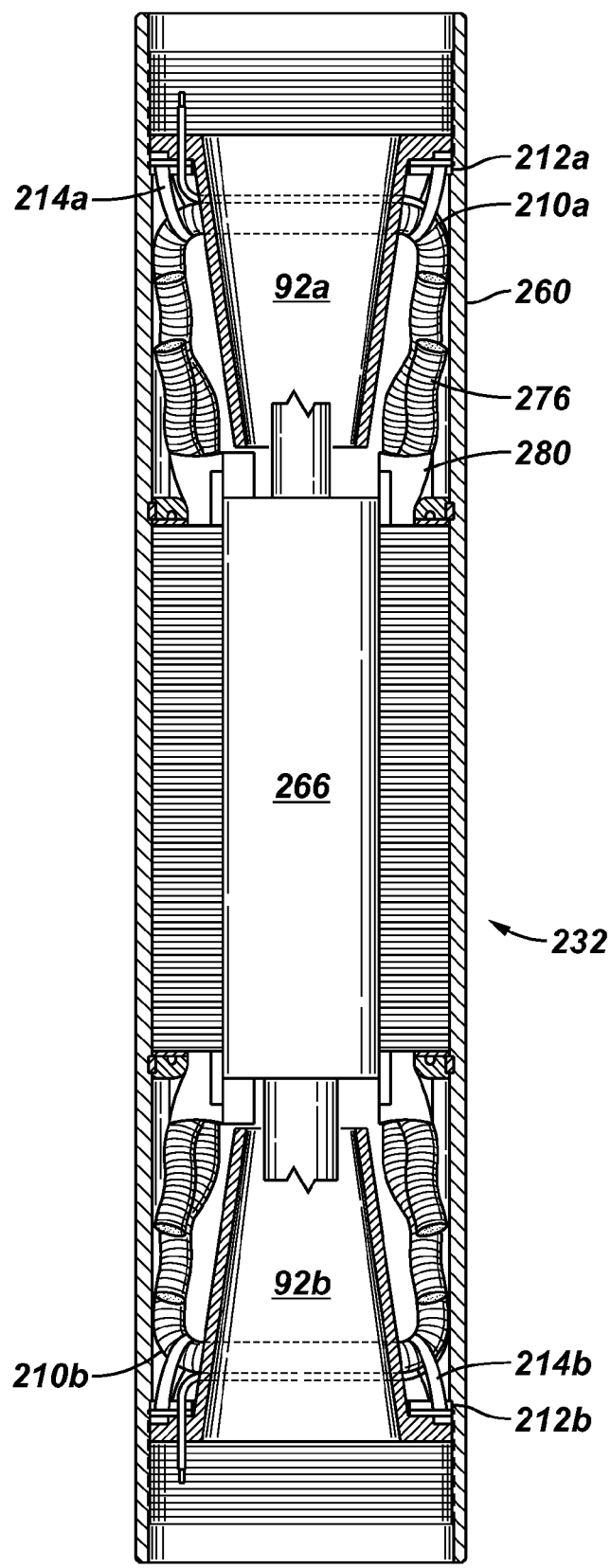
FIG. 5 is a partial cross-section of the submersible motor illustrated in the well system of FIG. 1, according to an embodiment.

Another embodiment might include using a conical structure in conjunction with fiberglass tape 214a and 214b to prevent the axial and radial movement of the stator coil 276. Conical structures 92a and 92b are inserted as depicted in FIG. 5 and will keep the stator coils 276 in place against the motor housing 260. Then, the end turns 210a and 210b are fastened to the support device 212a and 212b with fiberglass tape 214a and 214b, respectively. The conical structures 92a and 92b reduces the stress on the fiberglass tape 214a and 214b respectively. The conical structures 92a and 92b also allow mechanically weaker materials with improved characteristics such as thermal resistance to be used as the connecting device.

Alternatively, the support device 84a and 84b can be composed of a suitable metal other than stainless steel, such as a suitable polymer, plastic compound, a metal with an insulation coating, and/or composite compound. The support device 84a and 84b can be either a conductive or non-conductive metal depending on the distance from the end turns and other design considerations such as the insulation on the end turns and the type of fastening mechanism material.

Alternatively, the connecting device 86a and 86b can be composed of Nylon, Teflon, or other suitable materials or equivalent material or combinations known in the art.

Alternatively, the support device 84a and 84b can be mounted on a shoulder within the housing 60 instead of threading into place. The support device 84a and 84b can also be threaded into place and stopped with a shoulder.

Alternatively, the support device 84a and 84b can utilize some other type of contact point other than slots or holes that is known in the art.

The embodiments described above provide examples of submersible motors and support devices that can be used to improve the run life of a variety of well systems. It should be noted, however, that the fastening mechanism can be used to prevent the radial inward collapse of end coils in many types of motors and in a wide variety of well related applications. Additionally, the material used to create the fastening mechanism, the number of fastening mechanism components used in an individual motor, and the configuration of those components can be adjusted as needed for a given application. Though multiple stator coils 76 are noted most often, one or more end coils are contemplated. Also, though stator coils 76 and associated parts and description and most often contemplated with respect to both ends of a motor/stator device, it is contemplated that separate features are equally applicable to only one end thereof.

Accordingly, although only a few embodiments of the present invention have been described in detail above, those of ordinary skill in the art will readily appreciate that many modifications are possible without materially departing from the teachings of this application. Such modifications are intended to be included within the scope as defined in the claims.

What is claimed is:

1. A downhole electric motor device comprising:
    a longitudinally extending tubular housing;
    a stator deployed within the tubular housing;
    a stator coil winding looped through the stator with an end turn having an apex;
    a support device adjacent to an end of the housing and an end of the stator, wherein the profile of the support device is substantially flat and disc shaped; and
    a connecting device connected between at least one of the coil windings and the support device, thereby supporting the coil winding.

2. The device of claim 1, wherein the stator coil comprises magnet wire at least partially wrapped with a material selected from a list consisting of fiberglass tape, Teflon tape, a Nylon based material, and a Polyetheretherketone based material.

3. The device of claim 2, wherein the stator coil is coated with epoxy.

4. The device of claim 1, in which the electric motor has three phases and comprises a pair of end turns for each of the three phases.

5. The device of claim 1, wherein the support device is in the shape of a ring and comprises openings for the connecting device to connect.

6. The device of claim 1, wherein the support device comprises at least one material selected from the list consisting of an insulating material, a powder coated steel, a steel alloy, a ceramic material, a plastic material, and a carbon fiber composite.

7. The device of claim 1, wherein the connecting device comprises a material selected from a list consisting of at least one of the following a tape comprising fiberglass, a string comprising a polymer based material, and a tape comprising Teflon.

8. The device of claim 1, further comprising:
    a pump; and
    a motor protector.

9. The device of claim 8, in which the electric submersible motor has three phases and comprises a pair of end turns for each of the phases; and
    the support device comprises at least one material selected from the list consisting of an insulating material, a powder coated steel, a steel alloy, a ceramic material, a plastic material, and a carbon fiber composite.

10. The device of claim 4, wherein the support device comprises at least one material selected from the list consisting of an insulating material, a powder coated steel, a steel alloy, a ceramic material, a plastic material, and a carbon fiber composite.

11. A downhole electric motor device comprising:
    a longitudinally extending tubular housing;
    a stator deployed within the tubular housing;
    a stator coil winding looped through the stator with an end turn having an apex;
    a support device adjacent to an end of the housing and an end of the stator, wherein the profile of the support device is a sinusoidal shape; and
    a connecting device connected between at least one of the coil windings and the support device, thereby supporting the coil winding.

12. The device of claim 11, wherein the stator coil comprises magnet wire at least partially wrapped with a material selected from a list consisting of fiberglass tape, Teflon tape, a Nylon based material, and a Polyetheretherketone based material.

13. The device of claim 12, wherein the stator coil is coated with epoxy.

14. The device of claim 11, in which the electric motor has three phases and comprises a pair of end turns for each of the three phases.

15. The device of claim 11, wherein the support device is in the shape of a ring and comprises openings for the connecting device to connect.

16. The device of claim 11, wherein the support device comprises at least one material selected from the list consisting of an insulating material, a powder coated steel, a steel alloy, a ceramic material, a plastic material, and a carbon fiber composite.

17. The device of claim 11, wherein the connecting device comprises a material selected from a list consisting of at least one of the following a tape comprising fiberglass, a string comprising a polymer based material, and a tape comprising Teflon.

18. The device of claim 14, wherein the support device comprises at least one material selected from the list consisting of an insulating material, a powder coated steel, a steel alloy, a ceramic material, a plastic material, and a carbon fiber composite.

19. The device of claim 11, further comprising:
    a pump; and
    a motor protector.

20. The device of claim 19, wherein:
    the electric motor has three phases and comprises a pair of end turns for each of the phases; and
    the support device comprises at least one material selected from the list consisting of an insulating material, a powder coated steel, a steel alloy, a ceramic material, a plastic material, and a carbon fiber composite.

* * * * *